(12) United States Patent
Duqueine

(10) Patent No.: US 6,884,379 B1
(45) Date of Patent: Apr. 26, 2005

(54) PROCESS FOR MOLDING A PART MADE OUT OF A COMPOSITE MATERIAL

(76) Inventor: Vincent Duqueine, 3, rue de la Roche - St. Fortunat, 69370 St. Didier Au Mont d'Or (FR)

( * ) Notice: Subject to any disclaimer, the term of this patent is extended or adjusted under 35 U.S.C. 154(b) by 281 days.

(21) Appl. No.: 10/209,635

(22) Filed: Jul. 30, 2002

(51) Int. Cl.[7] .......................... B29C 43/20; B29C 41/46; B29B 13/00
(52) U.S. Cl. ...................... 264/258; 264/263; 264/266; 264/271.1; 264/279.1; 264/319
(58) Field of Search ................................ 264/258, 263, 264/266, 271.1, 279.1, 319

(56) References Cited

U.S. PATENT DOCUMENTS 5,853,651 A * 12/1998 Lindsay et al. ............. 264/512
6,627,018 B1 * 9/2003 O'Neill et al. ............... 156/78

* cited by examiner

Primary Examiner—Stephen J. Lechert, Jr.
(74) Attorney, Agent, or Firm—Harrison & Eqbert

(57) ABSTRACT

The process includes placing in a mold a pile of plies taken from a web of fibers embedded in a thermosetting or thermoplastic material, the plies being arranged according to preferred directions of the fibers, and subjecting the mold to particular pressure and temperature conditions. The process also includes carrying out successive operations of shaping the pile of plies in the mold, at low pressure, carried out progressively at low speed; removing the material in excess protruding out of edge of the mold; carrying out the tightness of the mold from outside; increasing the pressure up to high pressure; raising the temperature of the mold; and quickly cooling the mold.

3 Claims, 3 Drawing Sheets

PROCESS FOR MOLDING A PART MADE OUT OF A COMPOSITE MATERIAL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a process for molding a part made out of a composite material and the device allowing implementing said process.

BACKGROUND OF THE INVENTION

There are already known various processes for molding parts made out of a composite material, allowing shaping said material, which consists of fibers embedded in a thermosetting or thermoplastic matrix, by means of a mold and in association with particular pressure and temperature conditions.

The fibers are generally made out of glass, carbon or aramid, while the matrix is of the epoxy, phenol or similar type.

The known processes also differ according to the way the composite material is implemented in the mold. Most of these processes use a mat in the form of a non-woven web of fibers extending parallel to each other, and from which are taken either plies aimed at being superposed eventually while changing the orientation of the fibers, in order to increase the strength of the whole, or more or less long and/or wide pieces that are arranged in the mold, said pieces of pre-impregnated web being arranged loose at random or according to a particular tri-dimensional arrangement in connection with the use of the part to be made.

One should note that the pieces of pre-impregnated web can be formed into a structure made outside the mold, which allows arranging the fibers according to a preferred orientation, and thus obtaining an increased resistance against a known effort. This way of operating is however time-consuming.

EP 0,025,689 discloses a complex manufactured by such a process, and which consists of a sheet made by assembling two sheets made, in turn, by assembling pieces cut out of a web of pre-impregnated fibers.

From FR 2,740,149 is also known a process for molding from a sheet made by assembling pieces of a web of pre-impregnated fibers. The pieces of web are superposed horizontally and at random, in order to form a structure that is then subjected to a pressure in the range of 10 to 80 kg/cm$^2$ and to a temperature in the range of 210 to 350° C.

On the other hand, EP 0,916,477 discloses a process for molding a part made out of a composite material, starting from a composite structure formed by assembling pieces of a web of pre-impregnated fibers, in which said pieces are so arranged as to achieve a tri-dimensional arrangement of the fibers, said structure being then subjected to a temperature in the range of 150° C. and to a pressure in the range of 10 to 100 bars.

One should note that during the putting under high pressure there has thus been observed some flowing of the thermosetting or thermoplastic material, which can be assimilated to a draining of the fibers, so that the part obtained has a low strength.

The above-mentioned processes are for manufacturing particular objects, thus the process of FR 2,740,149 is intended for manufacturing reinforced tips of shoes, while the process of EP 0,916,477 is mainly intended for manufacturing objects such as cranks for the crank-gear of a bicycle. Though these objects have a high strength, it is nevertheless limited, which does not allow manufacturing certain parts that have a somewhat complex shape.

For instance, in the case of hollow parts having joining elements with different axes, it is necessary to use a core around each portion of which ply cushions are arranged, then to place the whole in a mold under pressure. One observes however a very bad connection between the different elements, since it results only from the flowing of the thermosetting or thermoplastic matrix.

Furthermore, in the particular case of an object having one or several through holes, it is possible to proceed in various ways.

A drilling can be carried out after molding, with, besides the difficulty due to the hardness of the material, the inconvenience of severing the fibers, which results into a relative weakness in the vicinity of the hole.

As in the earlier EP 0,916,477, one can also use an insert or core arranged in the mold and, eventually, wind pieces of a web of pre-impregnated fibers around this insert or core, which gives rise to risks of discontinuity in the network of fibers over the complete manufactured object.

Furthermore, the presently known processes require, after removal from the mold, labor-expensive machining and deburring work that can be prejudicial to the strength of the manufactured object.

From EP 0 355 641, JP 02 131929 and EP 0 755 772 are also known processes for manufacturing, through molding, objects made out of a composite material, in which it is foreseen to carry out steps of shaping, eliminating material in excess, pressing and heating, then cooling. One could observe that the objects obtained by means of the processes disclosed in these documents have no homogenous strength, namely because of said processes and because of the devices allowing implementing them.

The present invention is aimed at coping with these various drawbacks by providing a process for molding a part made out of a composite material that namely allows manufacturing parts having a higher strength than the parts obtained by means of the presently known molding processes, irrespective of the complexity of that part.

The process for molding a part made out of a composite material according to the invention is of the type consisting in placing in a mold a pile of plies taken from a web of fibers embedded in a thermosetting or thermoplastic material, and arranged according to preferred directions of said fibers, and in subjecting said mold to particular pressure and temperature conditions, and it is characterized in that it consists in carrying out successive operations of:

shaping said pile of plies in the mold, at low pressure, carried out progressively at low speed;
  removing the material in excess protruding out of the edge of the mold;
  carrying out the tightness of the mold from outside;
  increasing the pressure up to high pressure;
  raising the temperature of the mold; and
  quickly cooling the mold.

The process according to the invention allows carrying out a real forging of the composite material, which grants the obtained part very high strength, which allows contemplating the manufacture of parts manufactured so far out of metal, for example aluminum.

The existing processes, namely those disclosed in EP 0 355 641, JP 02 13 1929 and EP 0 755 772, do not allow achieving this result, indeed, removing the material in excess is carried out prior to shaping and prior to putting under pressure, so that the quantity of material used is not optimal, and cutting during pressing generally causes flowing of the thermosetting matrix, which results into a weakening of the part obtained through molding.

In addition, in the processes of the above-mentioned documents, it is not foreseen to carry out the tightness of the mold, so that one observes flowing of the thermosetting or thermoplastic matrix.

According to an additional feature of the process according to the invention, the high pressure is between 50 and 200 bars, while the heating temperature for the mould is between 125 and 135° C.

One should note that using a pressure up to 200 bars is possible only because of carrying out the tightness of the mold from outside, otherwise, a draining of the fibers is observed.

According to another additional feature of the process according to the invention, the operation of removing the material in excess is associated, when the part to be manufactured should include one or several through-holes, to an operation of punching through the mold.

Simultaneously with the removal of the material in excess there is carried out a punching through the mold, and the punch or punches or die-cutters are kept in place during the pressing and heating operations.

When starting punching, the fibers are not immediately cut, so that after cutting, their ends are oriented along an axis different from their main axis, which provides the edge of the hole with a particular strength, which does not allow obtaining, for example, a drilling and removing operation.

One should note that there is also obtained a re-orientation of the ends of the fibers at the periphery of the part when cutting the material in excess.

One should note that punching is carried out after shaping within the mold under low pressure, which is very important. For example, in EP 0 355 641, a punching is indeed carried out in the mold prior to shaping and prior to putting under pressure, or then simultaneously and not successively, which results into a risk of flowing of the thermosetting matrix and also of suppressing some fibers, and hence, of not achieving any forging.

For manufacturing complex parts, such as those evoked above, for example, hollow parts including several joining elements with different axes, the putting under pressure with tightness of the mold allows, since there is no draining, the fibers to flow, so that there is an interweaving of the fibers of a cushion for the manufacture of one of said elements with the fibers of one or several other cushions, so as to achieve a very strong part.

BRIEF SUMMARY OF THE INVENTION

The device allowing implementing the molding process according to the invention is of the type including a means for compressing a mold comprised of at least two parts between which the pile of plies is arranged, and it is characterized in that it includes:

a cutting means movable with respect to said mold and capable, under the action of a driving means, of cutting the material in excess protruding out of said parts after compressing them and of matching the external shape of said parts at the level of their line of junction, in order to form a tight seam as well as means capable of heating and quickly cooling said parts.

The existing devices are designed so as to be capable of implementing the existing processes, thus, they generally include two parts between which the pile of plies is arranged, said parts having the shape to be manufactured, and at least one of said parts includes a cutting blade or the like allowing removing the material in excess prior to or simultaneously with the shaping, with the aforementioned drawbacks this leads to.

According to an additional feature of the device according to the invention, the pressing and driving means consist of aligned jacks acting in opposite direction.

According to another additional feature of the device according to the invention, the means capable of heating and quickly cooling the parts of the mold consist of means allowing causing a pressurized heat-carrying liquid to flow in them, associated with means allowing heating or cooling said heat-carrying liquid.

One should note that the heating operation can also be carried out electrically or by induction, the cooling being carried out by means of a heat-carrying liquid.

According to another additional feature of the device according to the invention, it includes at least one punch capable of passing through those parts of the mold that have, to this end, holes in front of each other.

According to another additional feature of the device according to the invention, the punch or punches are integral with the cutting means and driven by the same driving means.

The advantages and the features of the device according to the invention will become clear when reading the following description, which refers to the attached drawing that shows a non-restrictive embodiment of it.

DETAILED DESCRIPTION OF THE INVENTION

Figure 1:
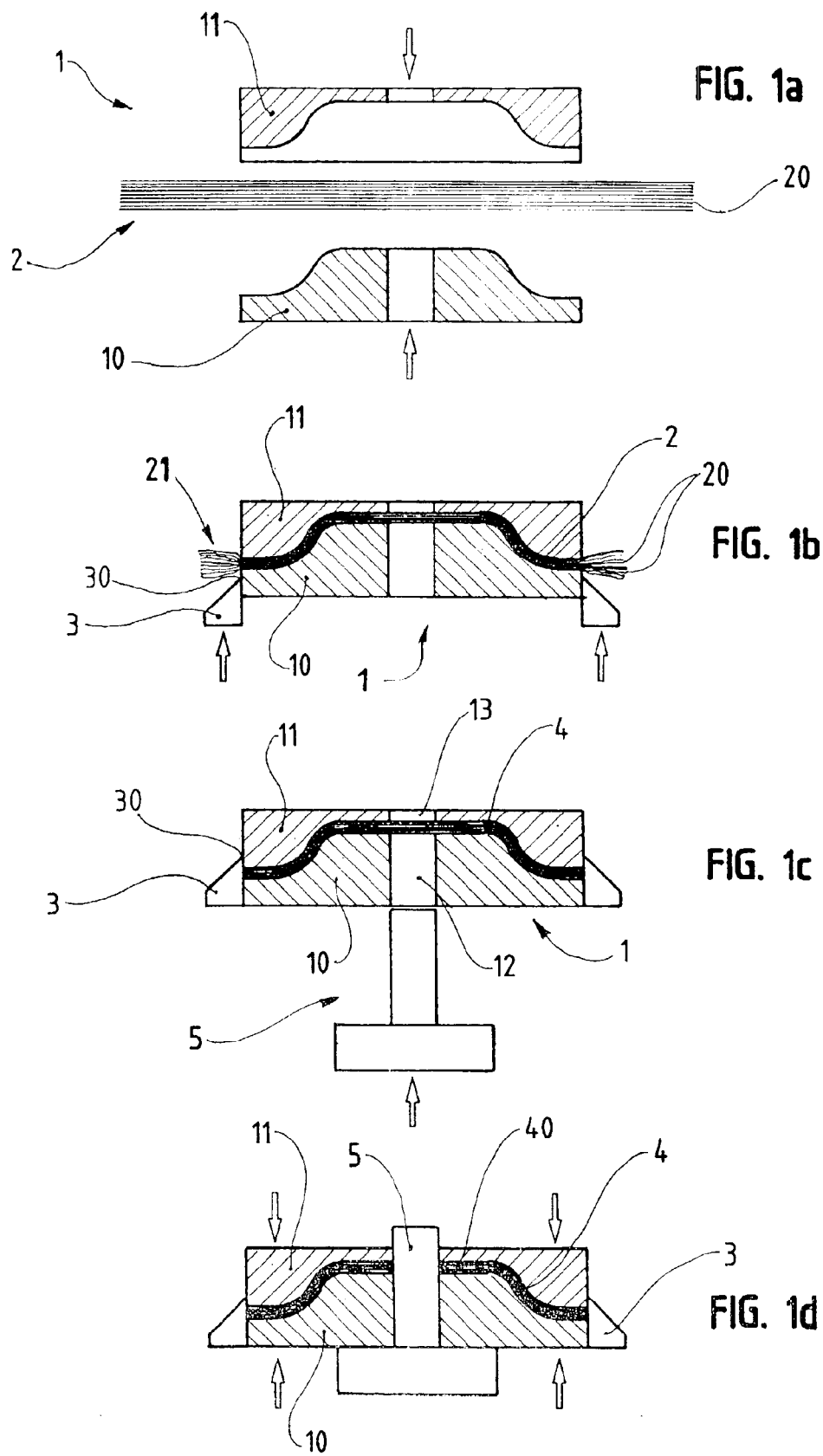
FIGS. 1a, 1b, 1c and 1d represent schematic views showing different steps of the molding process according to the invention.

When referring to FIG. 1a, there is shown a first step of the molding process according to the invention, by means of a device including namely a mold 1 comprised of two parts, a male portion 10 and a female portion 11.

The first step consists in arranging between the two parts 10 and 11 of the mold 1 a pile 2 of plies 20 cut out from a web of fibers embedded in a thermosetting or thermoplastic matrix. The fibers are of glass, carbon or aramid, while the matrix is of the epoxy, phenol or a similar type. The piles 20 are not piled up at random, they are preferably so arranged that from one ply 20 to the next one the fibers extend in different directions, so as to achieve a predetermined crossing between them.

One should note that the pile 2 can either be arranged between the parts 10 and 11 of the mold 1 or be applied against either one of the parts 10 and 11, in order to avoid, in the case of a particular complex shape of the mold form, a flowing of the thermosetting or thermoplastic matrix, and thus creating one or several areas deprived of reinforcing fibers.

The next step consists in bringing both parts 10 and 11 together and in clamping the pile 2 with a small force, bringing the parts 10 and 11 together occurring progressively, at a speed in the range of 3 millimeters per second, so that the pile takes the shape of the mold form, as shown in FIG. 1b.

The speed with which both parts 10 and 11 are brought together may vary according to the complexity of the part to be manufactured. Likewise, this speed may vary according to the temperature of the tools. A slow speed associated with a determined temperature will, depending on the type of the part, allow, to a more or less important extent, a sliding between each ply.

The dimensions of the plies 20 are so calculated that, after shaping, they protrude over the complete periphery of the mold 1, in order to avoid lack of them from being formed. It is therefore necessary to proceed to removing the excess 21, which occurs by means of a knife 3, mobile in vertical translation, and capable of closely matching the external shape of the mold 1.

One should note that the knife 3 should be of a strong design and that, on the other hand, its edge 30 should, preferably, not be contained in a plane, in order to avoid, when the peripheral edge of the part to be molded is mostly flat, attacking the material in a direction parallel to it. Thus, the edge 30 of the knife 3 describes a broken line or a curve, so as to never be parallel to the material to be cut.

When referring to FIG. 1c, it can be seen that the knife 3 has removed the material in excess 21 and that it remains in place on the periphery of the mold 1, which allows closing the latter in a tight way.

In the example shown, the part 4 to be manufactured should include a through-hole 40 arranged centrally, therefore, the parts 10 and 11 of the mold 1 include, each, a hole 12 and 13, respectively, while a die-cutter 5, mobile in vertical translation, is capable of being inserted into the hole 12, then into the hole 13, so as to carry out the drilling of the pile 2.

With reference now to FIG. 1d, it can be seen that after carrying out the drilling of the pile 2, the die-cutter 5 is kept in place, in a tight way, and the parts 10 and 11 are pressed towards each other, which is carried out under a pressure in the range of 50 to 200 bars, while they are simultaneously heated at a temperature in the range of 125 to 135° C., preferably 132° C., the pressure and the temperature being maintained for a period in the range of 15 to 20 minutes.

One should note that end stops are preferably not provided for on the parts 10 and 11, their closing occurring directly on the plies 20, which allows reaching high pressures and therefore requires the tightness to be perfect, in order to avoid a draining of the fibers.

Bringing the mold 1 at temperature occurs by means of a heat carrying fluid, such as water, flowing under pressure in conduits, not shown, each of the parts 10 and 11 includes, or electrically or by induction.

The mold 1 is then cooled by means of a heat-carrying fluid, afterwards the knife 3 as well as the die-cutter 5 are removed, and the parts 10 and 11 of the mold 1 are separated from each other, in order to release the molded part 4.

From the point of view of the implementation, a jack allows pressing the parts 10 and 11 of the mold 1 against each other, while a second jack, acting in the opposite direction with respect to the first one, pushes the knife 3 and a third jack, the action of which is identical to that of the second one, pushes the die-cutter 5.

One should note that, according to a variant, the knife 3 and the die-cutter 5 can be made integral with each other, so that they are driven by the same jack, whereby cutting and punching occur simultaneously.

The part 4 thus manufactured has a high strength, which is not reduced by the presence of the hole 40, since the bringing about of the latter does not alter the continuity of the network of fibers at the level of the complete part.

On the other hand, since the bringing about of the hole 40 can be assimilated to a forging around the die-cutter 5, it provides the wall edging it a strength that cannot be reached by the known processes, which consist either in drilling after removal from the mold or in placing in the mold an insert embedded prior to the molding.

The molding process according to the invention can have some variants, thus there can be used one or several inserts aimed at being placed in the pile 2, this or these inserts being of course capable of being clamped in the mold 1.

Figure 2:
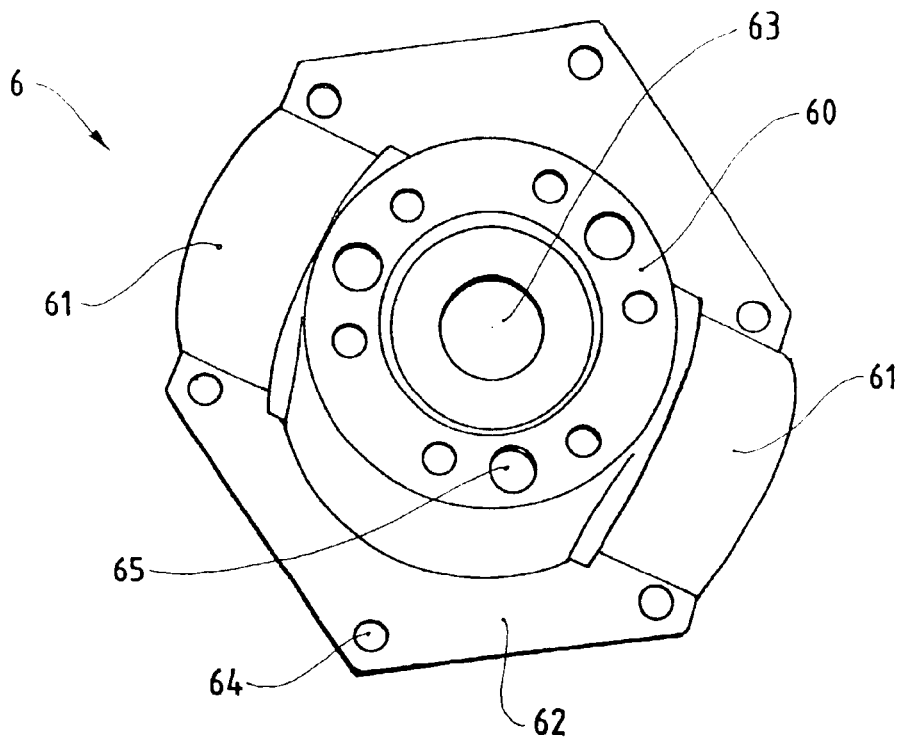
FIG. 2 shows a perspective view of a part manufactured with the process according to the invention.

With reference now to FIG. 2, there can be seen it part manufactured with the process according to the invention. It is a half shell 6 of a hub for helices of an ultra-light aircraft (ULA), whereby one should know that two identical half shells allow making a hub.

As can be seen, this half shell 6 has, in its median are a, a hollow portion 60 in which two portions 61 of a semi-tubular shape end, each one serving as a passageway for the end of a blade, while the periphery 62 is mostly flat.

One can observe that the half shell 6 includes many holes 63, 64 and 65, respectively for centering the helix, for fixing the plate and for blocking the blades, all of which are brought about with the process according to the invention, by means of a mandrel including the same number of die-cutters.

Figure 3:
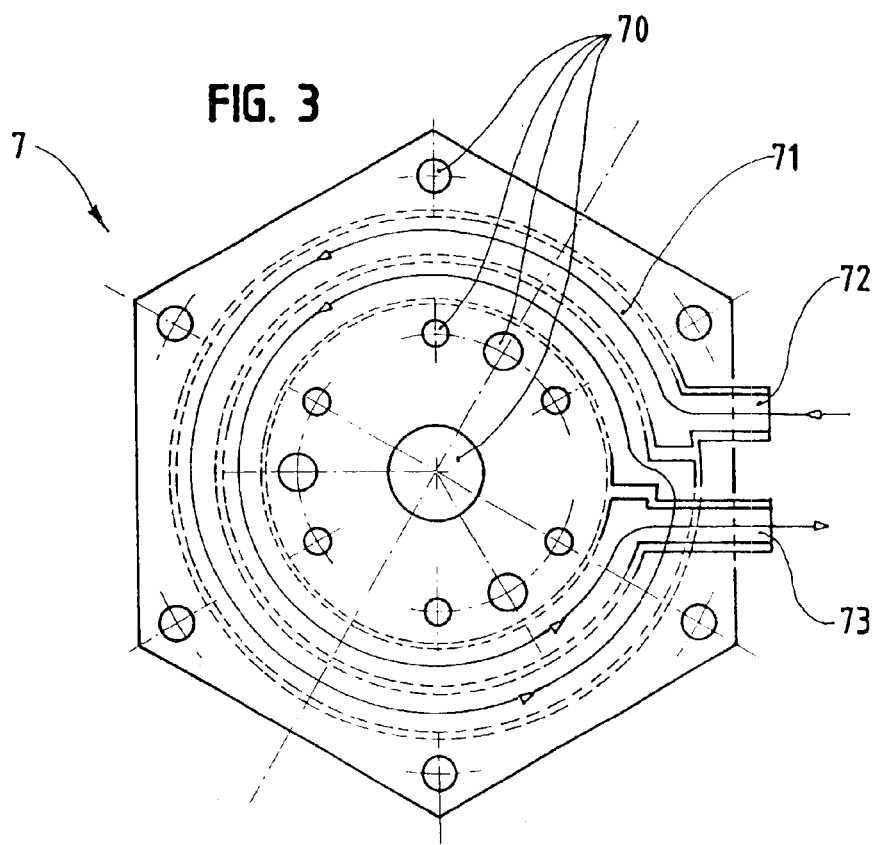
FIG. 3 represents a schematic plan view of a portion of the device allowing manufacturing the same part.

When referring now to FIG. 3, one can see the male or female portion 7 of a mold allowing manufacturing a half shell 6. One can observe that this portion 7 includes holes 70 serving as passageways for the die-cutters, as well as a peripheral internal channel 71 having an inlet 72 and an outlet 73, for circulating a heat-carrying fluid, such as water, allowing causing the temperature of the mold to raise, and namely the quick cooling of the latter.

Figure 4:
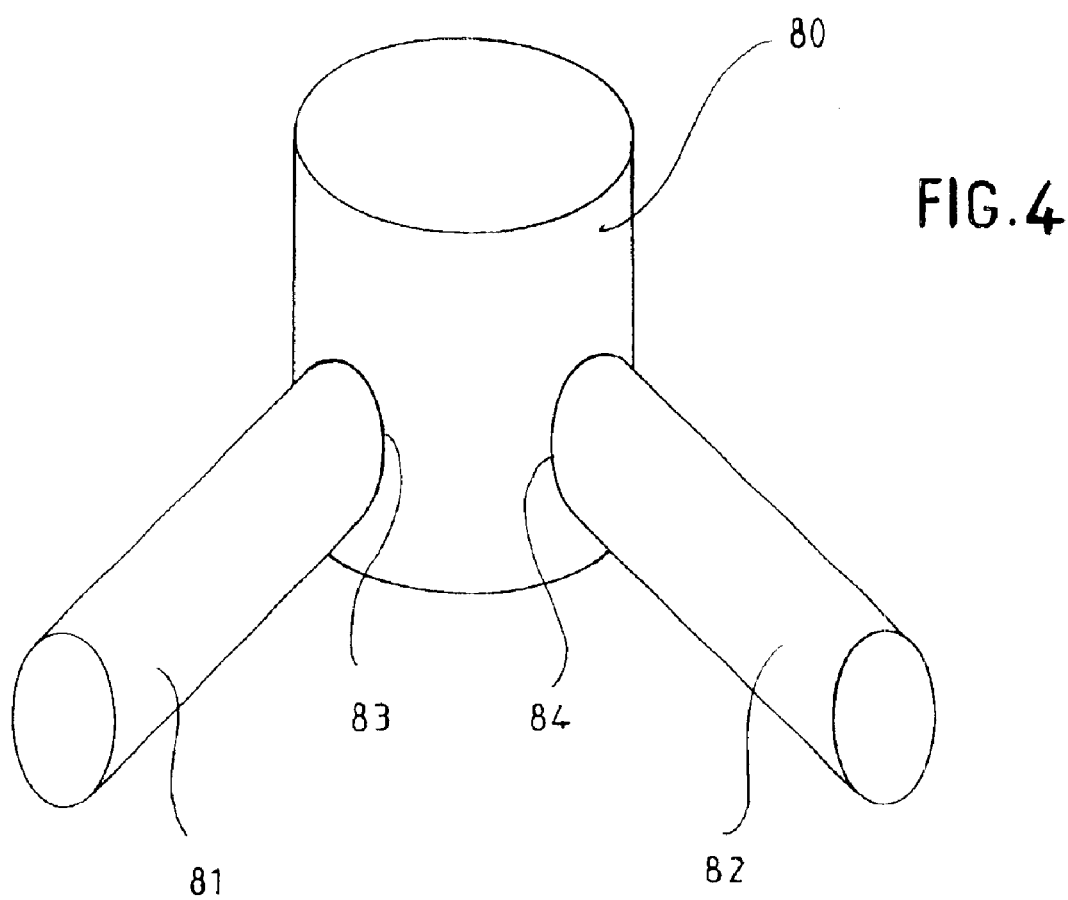
FIG. 4 represents a schematic perspective view of an object capable of being manufactured with the process according to the invention.

When referring now to FIG. 4, one can see a part 8 capable of being manufactured with the process according to the invention. This part 8 is obtained by radially assembling two bushings 81 and 82 onto one bushing 80, by means of their topside, 83 and 84, respectively.

In practice, one uses a core onto which piles of plies are arranged for bringing about a sleeve for each one of the bushings 80, 81 and 82, in association with connecting plies covering these sleeves. With the existing processes, making the bushings 80, 81 and 82 integral with each other is only possible thanks to the connecting plies and the flowing of the thermosetting matrix, so that a part with a low strength is obtained.

With the process according to the invention, one observes a flowing of the fibers, namely because of the association between tightness and high pressure, which considerably increases the connection between the bushings.

The process according to the invention thus allows the industrial manufacture of complex parts.

I claim:

1. Process for molding a part from a composite material comprising: placing, in a mold, a pile of plies taken from a web of fibers embedded in a thermosetting or thermoplastic material, said plies arranged according to preferred directions of said fibers, and subjecting said mold to particular pressure and temperature conditions, wherein said process further comprises:

shaping said pile of plies in the mold, at low pressure, carried out progressively at low speed;

removing material in excess protruding out of an edge of the mold;

carrying out a tightness of the mold from outside;

increasing pressure up to high pressure;

raising temperature of the mold; and quickly cooling the mold.

2. Process according to claim 1, wherein said high pressure is between 50 and 200 bars, while heating temperature for the mold is between 125 and 135° C.

3. Process according to claim 1, wherein said step of removing the material in excess comprises an operation of punching through the mold.

* * * * *